United States Patent
Hyun et al.

(10) Patent No.: US 7,747,007 B2
(45) Date of Patent: Jun. 29, 2010

(54) PROTECTIVE COVER FOR PORTABLE COMMUNICATION DEVICE

(75) Inventors: Sang-Min Hyun, Seoul (KR); Kwang-Ha Choi, Seoul (KR); Chang-Soo Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 12/191,615

(22) Filed: Aug. 14, 2008

(65) Prior Publication Data

US 2009/0052654 A1    Feb. 26, 2009

(30) Foreign Application Priority Data

Aug. 24, 2007    (KR) .................... 10-2007-0085588

(51) Int. Cl.
*H04M 1/00* (2006.01)
*H04M 9/00* (2006.01)
(52) U.S. Cl. ............. 379/437; 379/451; 455/575.8
(58) Field of Classification Search ............ 379/419, 379/428.01, 433.04, 437, 441, 451; 455/575.1, 455/90.3, 575.8

See application file for complete search history.

(56) References Cited

U.S. PATENT DOCUMENTS

| | | | | |
|---|---|---|---|---|
| 5,303,291 | A | * | 4/1994 | Takagi et al. ............ 379/433.13 |
| 5,898,774 | A | * | 4/1999 | Shindo ................... 379/433.13 |
| 6,009,338 | A | * | 12/1999 | Iwata et al. .............. 455/575.4 |
| 6,208,879 | B1 | * | 3/2001 | Iwata et al. ................. 455/566 |
| 2006/0079189 | A1 | * | 4/2006 | Watanabe et al. .......... 455/90.3 |
| 2006/0121963 | A1 | * | 6/2006 | Gartrell et al. ........... 455/575.8 |
| 2007/0054522 | A1 | * | 3/2007 | Choi et al. .................. 439/144 |

* cited by examiner

*Primary Examiner*—Tuan D Nguyen
(74) *Attorney, Agent, or Firm*—H.C. Park & Associates, PLC (57) ABSTRACT

A protective cover for a portable communication device includes a battery cover and a protective cover part coupled with the battery cover. The protective cover is detachably coupled with the portable communication device, and the protective cover part is disposed at a front surface of a display unit part of the portable communication device when the protective cover is coupled with the portable communication device. The portable communication device being turned off/on when the portable communication device is attached to/detached from the protective cover.

13 Claims, 7 Drawing Sheets

PROTECTIVE COVER FOR PORTABLE COMMUNICATION DEVICE

CROSS REFERENCE TO RELATED APPLICATION

This application claims priority from and the benefit of Korean Application No. 10-2007-0085588, filed on Aug. 24, 2007, which is hereby incorporated by reference for all purposes as if fully set forth herein.

BACKGROUND OF THE INVENTION

1. Field of the Invention

The present invention relates to a protective cover for a portable communication device having a touch screen, and more particularly to a protective cover that has a structure in which a battery cover and a protective cover for a display unit part are assembled such that they may be detached from the portable communication device together.

2. Discussion of the Background

In general, "a portable communication device" refers to a device allowing a user to wirelessly communicate with another person. Portable communication devices include a HHP, a CT-2 cellular phone, a digital phone, a Personal Communication Service (PCS) phone, and a personal digital assistance (PDA). Also, portable communication devices may be classified as various types according to their appearances.

A typical bar-type portable terminal includes a body, an antenna unit installed at the upper end of the body, an earpiece including a speaker positioned at a lower side of the antenna unit, a display unit to perform a displaying function positioned at a lower side of the earpiece, a key pad including a plurality of numeric keys and a plurality of function keys positioned at a lower side of the display unit, and a microphone unit positioned at a lower side of the key pad.

A PDA performs voice communication and has a large display unit to perform a displaying function. The large display unit may include a touch screen to perform video communication, an electronic scheduler function, and a function of inputting/outputting various pieces of information. However, a large display unit may be vulnerable to external impact.

Figure 1:
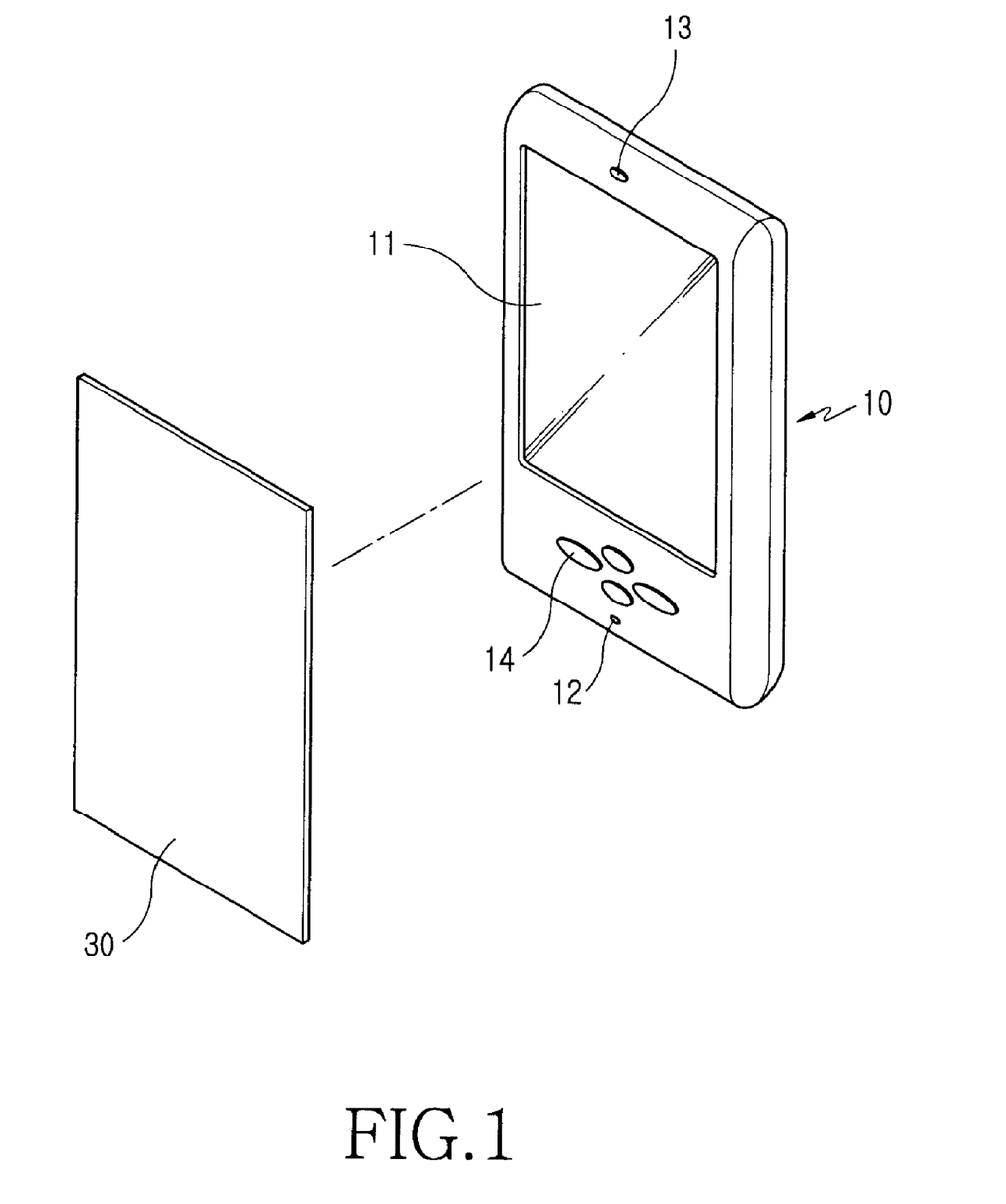
FIG. 1 is a perspective view of a conventional protective cover for a display unit part.
Figure 2:
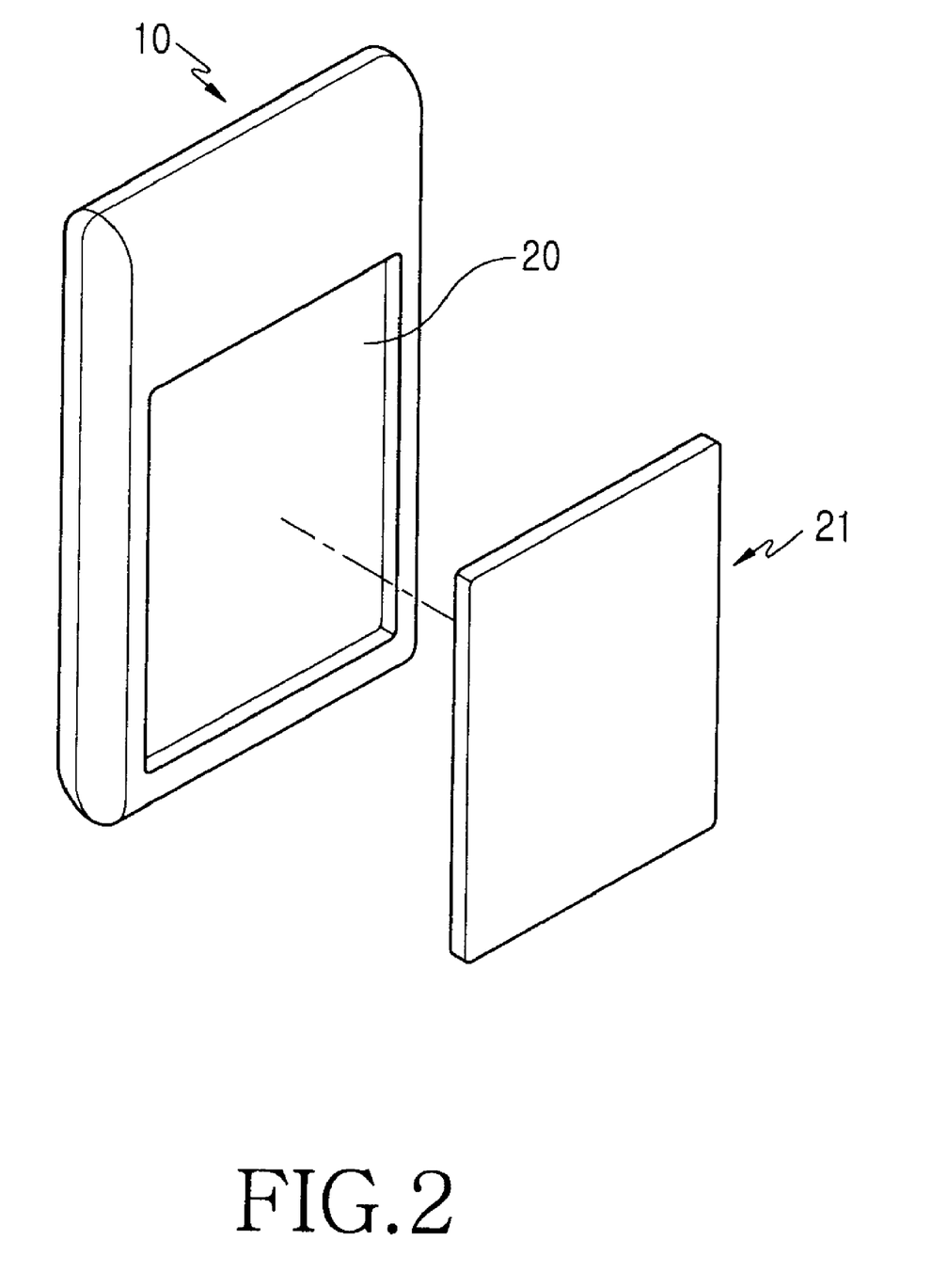
FIG. 2 is a perspective view of a conventional battery cover.

As shown in FIG. 1 and FIG. 2, a wireless PDA includes a main housing 10 including a large touch screen display unit 11, and the main housing 10 includes a microphone 12 and a speaker 13, which are disposed at upper and lower portions of the display unit part 11, respectively.

A plurality of keys 14 is positioned near the microphone 12.

As shown in FIG. 2, a battery pack 20 is detachably assembled with the rear surface of the main housing 10, and a battery cover 21 to protect the battery pack 20 is formed thereon. A separate leather case or a separate protective cover 30 may be provided for the large display unit 11 to prevent scratching or breaking of the display unit 11.

However, a conventional protective cover 30 for a portable communication device has a structure in which a protective cover to protect an external appearance of the communication device and a battery cover to protect a battery pack are separately assembled with the portable communication device. Therefore, a user may have to carry the covers with the portable communication device. As such, there may be inconvenience in that the user may easily lose the two covers and may have to perform multiple detaching operations when the user wants to detach the two covers from the communication device.

Also, when the two covers are assembled with the portable communication device, the thickness of the communication device may increase, thereby hindering the slimness of the device.

Further, there is a disadvantage in that, in order to use the communication device, the user may have to turn the portable communication device on after detaching the protective cover from the portable communication device.

SUMMARY OF THE INVENTION

The present invention provides a protective cover for a portable communication device. The protective cover has a structure in which a battery cover and a protective cover for a display unit are assembled such that they may be attached to/detached from the portable communication device together so that portability of the protective cover may be improved, loss of the covers may be prevented, and the thickness of the device may be decreased by reducing the number of parts thereof.

The present invention also provides a protective cover for a portable communication device, which includes a magnetic force applying part to detect if the protective cover is detached from the portable communication device and operate the device, which may improve effectiveness in using the device.

Additional features of the invention will be set forth in the description which follows, and in part will be apparent from the description, or may be learned by practice of the invention.

The present invention discloses a protective cover for a portable communication device. The protective cover includes a battery cover and a protective cover part coupled with the battery cover, and the protective cover is detachably coupled with the portable communication device. The protective cover part is disposed at a front surface of a display unit part of the portable communication device when the protective cover is coupled with the portable communication device, and the portable communication device turns off/on when the portable communication device is attached to/detached from the protective cover.

The present invention also discloses a protective cover for a portable communication device including a protective cover part and a battery cover. The protective cover part includes a display unit protecting cover including a magnetic force applying part, a supporting member, and a connecting member connecting the display unit protecting cover and the supporting member. The battery cover is arranged between the display unit protecting cover and the supporting member and is fixed to the protective cover part. The protective cover is detachably coupled with the portable communication terminal, and the magnetic force applying part allows a magnetic force sensor included in the portable communication device to sense a change in magnetic force when the portable communication device is attached to/detached from the protective cover to turn the portable communication device off/on.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Figure 3:
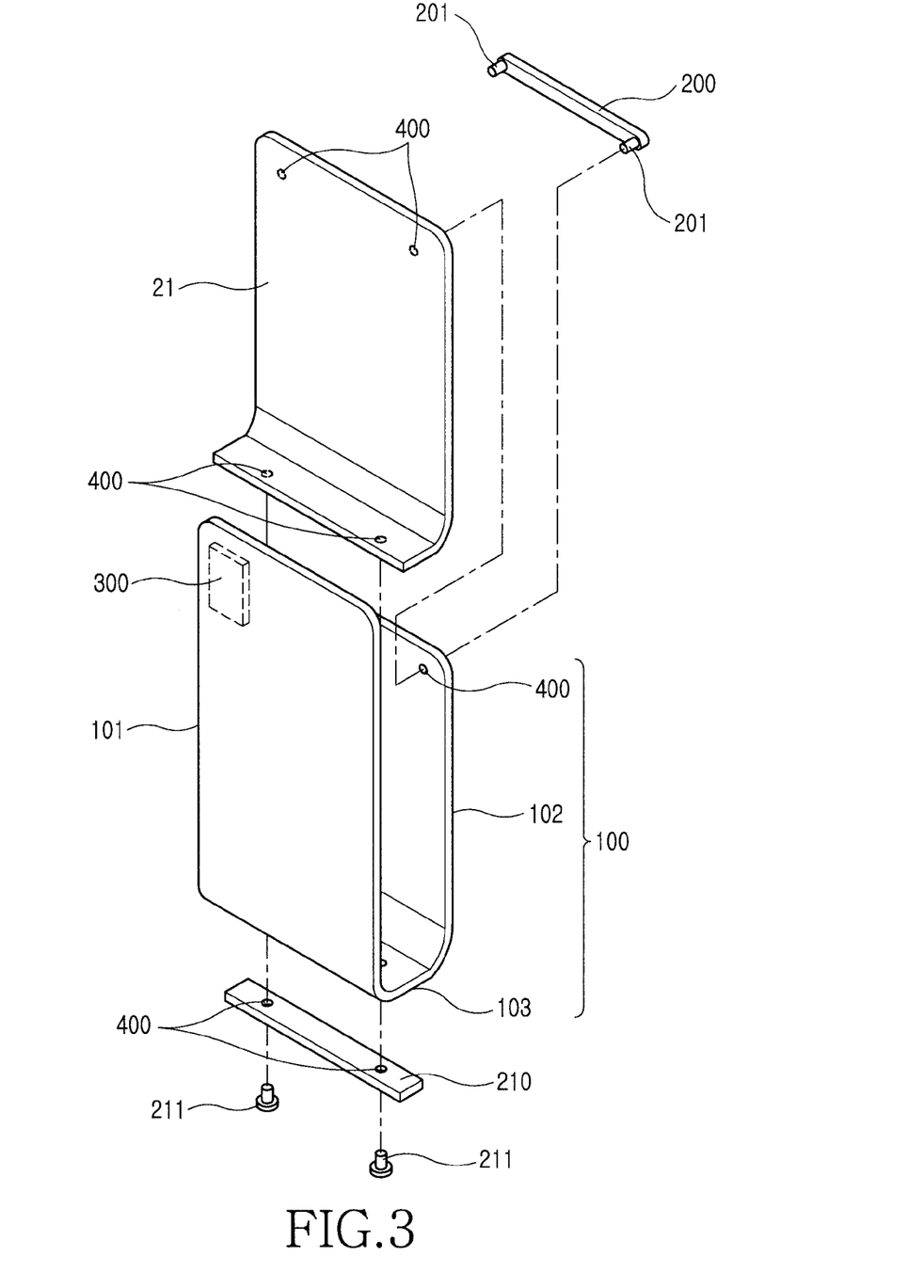
FIG. 3 is an exploded perspective view of a structure of a protective cover for a portable communication device according to an exemplary embodiment of the present invention.
Figure 7:
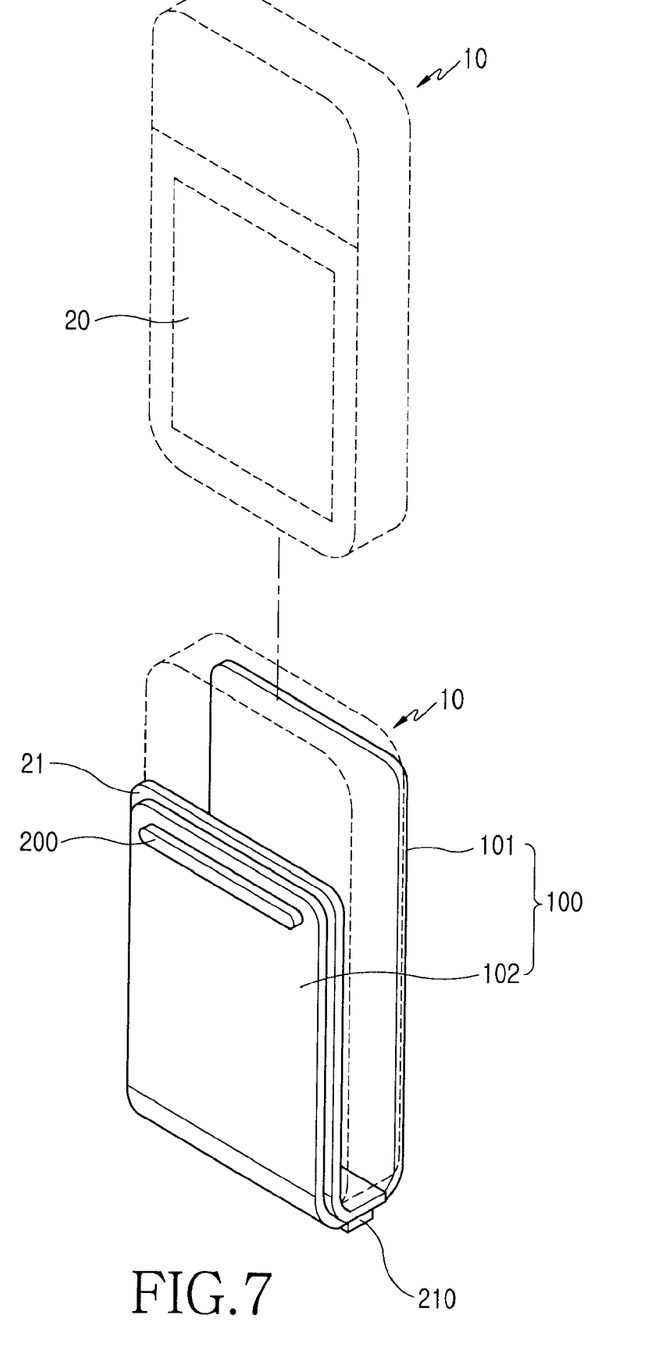
FIG. 7 is a perspective view of a protective cover for a portable communication device according to an exemplary embodiment of the present invention, in which the protective cover is used as a battery cover.

As shown in FIG. 3 and FIG. 7, a protective cover for a portable communication device includes a battery cover 21 and a protective cover part 100. The protective cover part 100 is assembled with the battery cover 21 so as to be attached to/detached from the portable communication device 10 together with the battery cover 21. When the protective cover part 100 is attached to the portable device 10, the protective cover part 100 is positioned at the front surface of an LDC part 11 of the portable communication device 10, and the battery cover 21 is positioned at the rear surface of the portable communication device 10.

Herein, the display unit part 11 has a touch screen.

Figure 6:
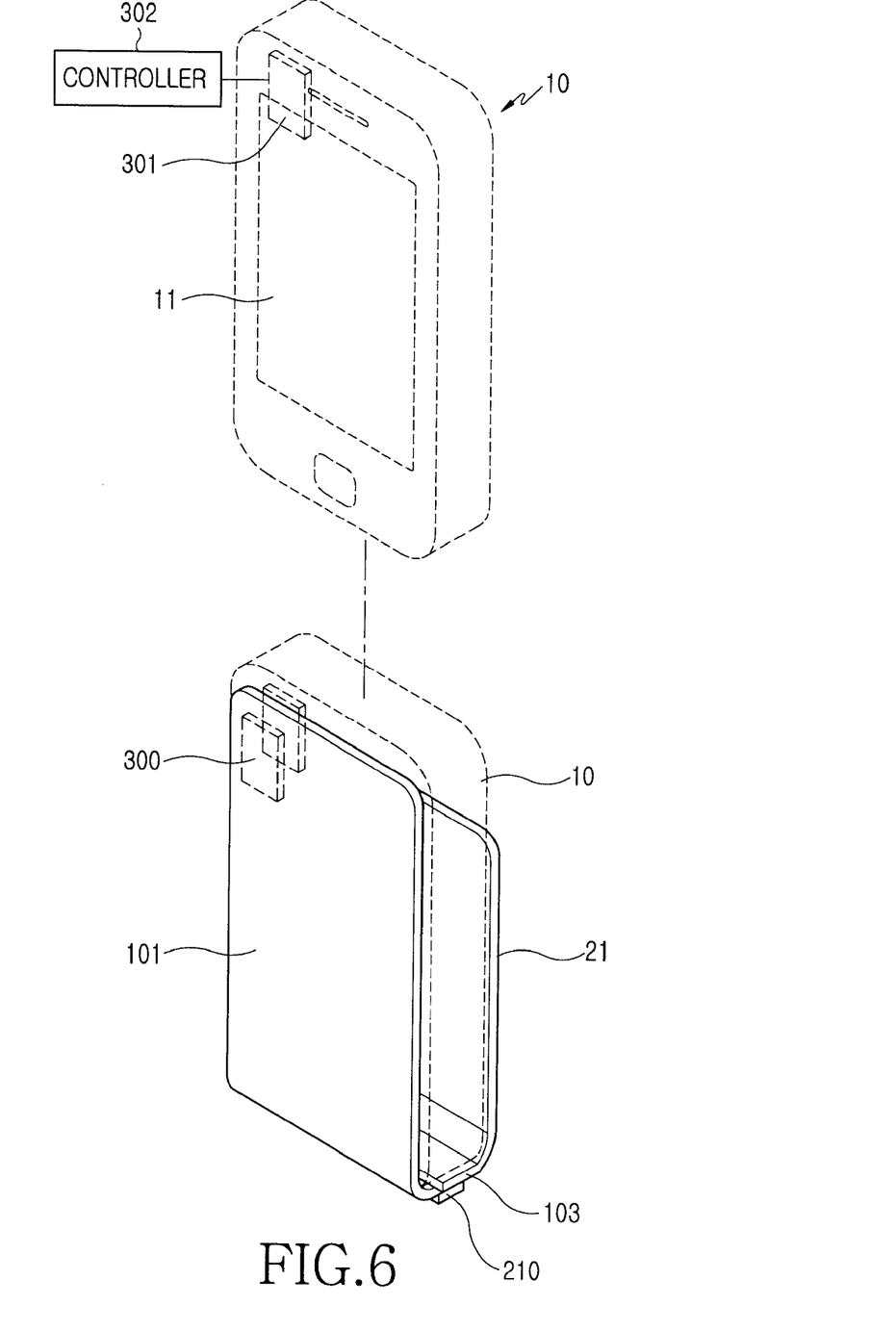
FIG. 6 is a perspective view of a protective cover for a portable communication device according to an exemplary embodiment of the present invention, in which the protective cover is used as a display unit protecting cover.

As shown in FIG. 6, a magnetic force applying part 300 is included in the protective cover part 100. The magnetic force applying part 300 allows a magnetic force sensor 301 included in the portable communication device 10 to sense a change in magnetic force so as to turn the portable communication device 10 on when the portable communication device 10 is separated from the protective cover part 100, and allows the magnetic force sensor 301 to sense change in magnetic force so as to turn the portable communication device 10 off when the portable communication device 10 is assembled with the protective cover part 100.

Figure 4:
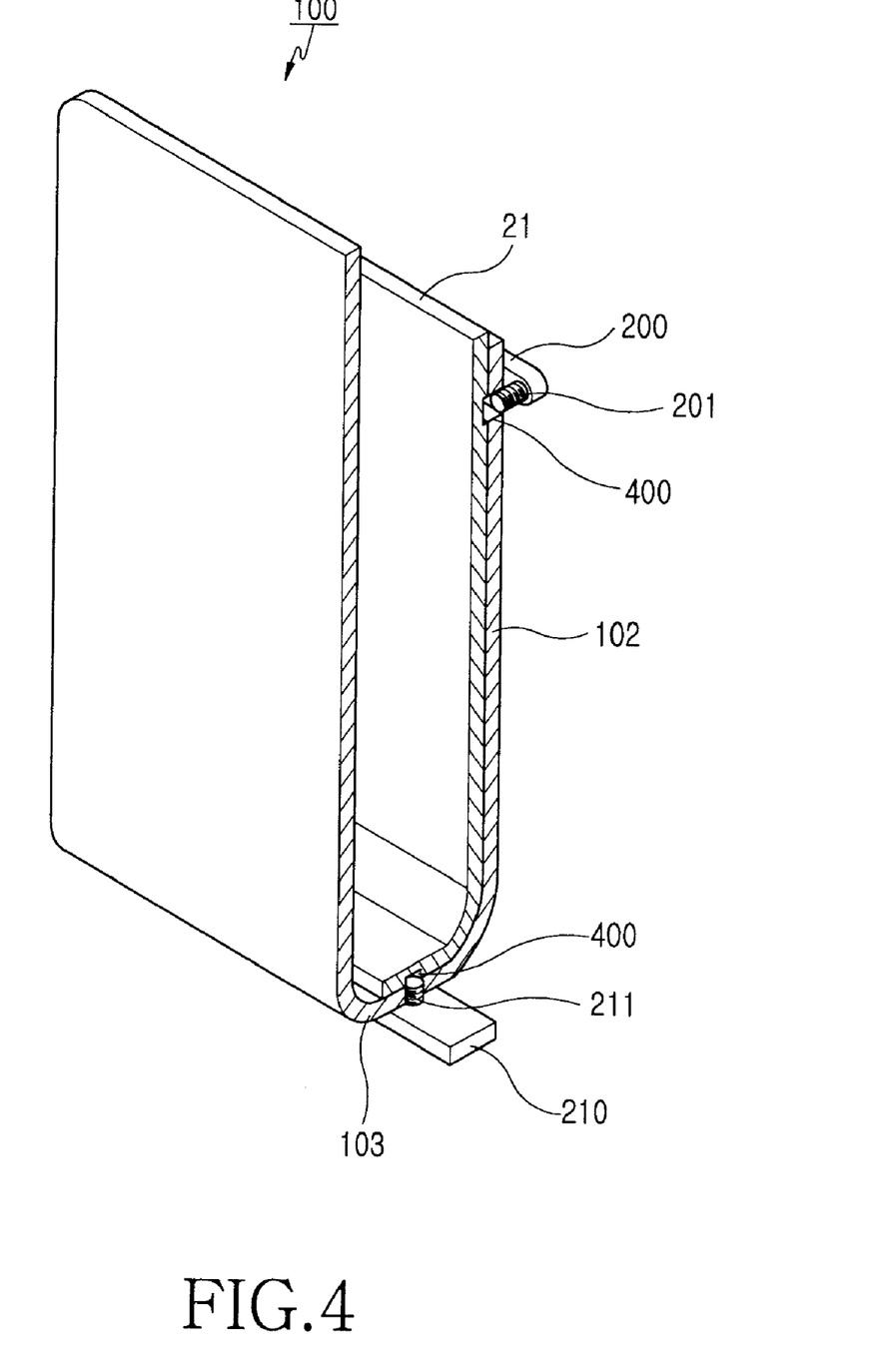
FIG. 4 is a cut-off perspective view of a structure of a protective cover for a portable communication device according to an exemplary embodiment of the present invention.
Figure 5:
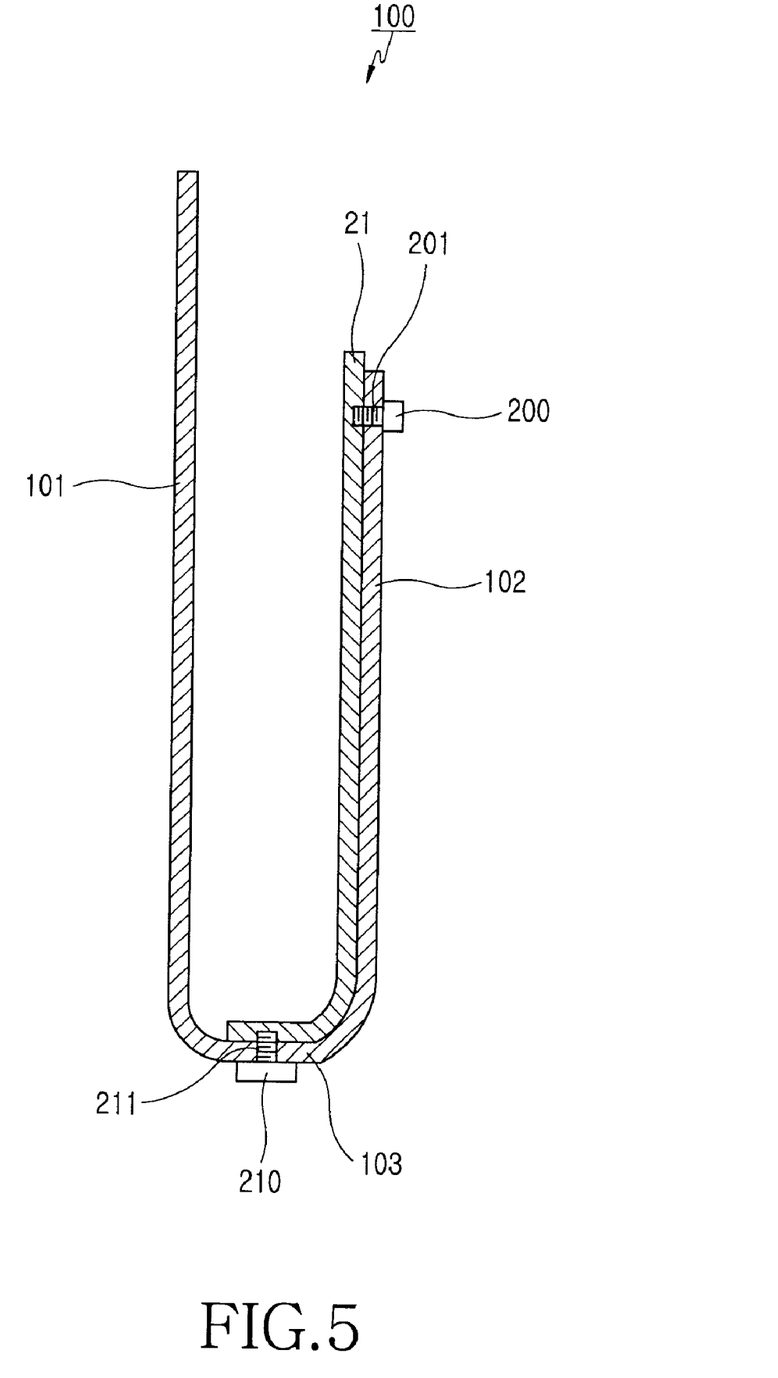
FIG. 5 is a side sectional view of a structure of a protective cover for a portable communication device according to an exemplary embodiment of the present invention.

As shown in FIG. 3, FIG. 4, and FIG. 5, the protective cover part 100 includes a display unit protecting cover 101, a supporting member 102, and a connecting member 103. The display unit protecting cover 101 allows the protective cover part 100 to be assembled with the portable communication device 10 and is positioned at a front surface of the display unit part 11. The supporting member 102 is disposed at one end of the display unit protecting cover 101 to be assembled with the battery cover 21 and support it. The connecting member 103 is disposed between the display unit protecting cover 101 and the supporting member 102 to connect the display unit protecting cover 101 with the supporting member 102.

As shown in FIG. 3, FIG. 4, and FIG. 5, a first fixing member 200 is included in the supporting member 102 to allow the battery cover 21 to be assembled and fixed, and a second fixing member 210 is included in the connecting member 103 to allow the battery cover 21 to be assembled and fixed. The first and second fixing members 200 and 210 have a decorated appearance made from metallic material and have at least one screw assembling part 201 and 211 so that a screw extends through a screw hole 400 formed at the protective cover part 100 to be assembled with a screw hole 400 formed at the battery cover 21.

The protective cover part 100 is U-shaped.

With reference to FIG. 3, FIG. 4, FIG. 5, FIG. 6, and FIG. 7, the operating of a protective cover for a portable communication device, which has the above-described structure, according to an exemplary embodiment of the present invention will be described in more detail.

As shown in FIG. 3, FIG. 4, and FIG. 5, the protective cover for the portable communication device 10, which includes the display unit part 11 with a touch screen capability, includes the battery cover 21 and the protective cover part 100. The protective cover part 100 includes the display unit protecting cover 101, the supporting member 102, and the connecting member 103. The supporting member 102 is included at one end of the display unit protecting cover 101, and the connecting member 103 is formed between the display unit protecting cover 101 and the supporting member 102. The battery cover 21 is assembled with the supporting member 102 and the connecting member 103.

At this state, as shown in FIG. 4 and FIG. 5, at least one screw assembling part 201 formed at the first fixing member 200 allows a screw to extend through a screw hole 400 formed at the supporting member 102 to be fastened to the screw hole 400 formed at the battery cover 21. At least one screw assembling part 211 formed at the second fixing member 210 allows a screw to extend through the screw hole 400 formed at the connecting member 103 to be fastened to the screw hole 400 formed at the battery cover 21.

Herein, as shown in FIG. 6 and FIG. 7, when the portable communication device is assembled with the protective cover part 100, the display unit protecting cover 101 is disposed at a front surface of the portable communication device 10 to protect the display unit part 11, and the battery cover 21 is disposed at a rear surface of the portable communication device 10 to protect the battery pack 20 mounted in the portable communication device 10.

As such, the protective cover part 100, which includes the display unit protecting cover 101, and the battery cover 21 are assembled together to form the protective cover, and when the protective cover is assembled with the portable communication device 10, the display unit part 11 as well as the battery pack 20 can be protected.

At this time, as shown in FIG. 6, the magnetic force applying part 300 is included in the display unit protecting cover 101. Therefore, when the protective cover part 100 is assembled with the portable communication device 10, the magnetic force sensor 301 senses the change in magnetic force of the magnetic force applying part 300 and turns off the portable communication device 10.

The magnetic force sensor 301 senses a change in magnetic force of the magnetic force applying part 300, and converts the change into a signal, which is applied to the controller 302. The controller 302 turns the portable communication device 10 off.

Herein, as shown in FIG. 6 and FIG. 7, when the protective cover part 100 is removed from the portable communication device 10 again, the display unit protecting cover 101 and the battery cover 21 are removed from the portable communication device together.

At this time, the magnetic force applying part 300 included in the display unit protecting cover 101 is removed from the portable communication device together with the display unit protecting cover 101, and the magnetic force sensor 301 included in the portable communication device 10 senses such removal. Accordingly, the controller 302 turns the portable communication device 10 on.

As such, it may be possible to operate the portable communication device 10 without a need to additionally push a power button (not shown).

It will be understood that when an element such as a layer, film, region or substrate is referred to as being "on" another element, it can be directly on the other element or intervening elements may also be present. In contrast, when an element is referred to as being "directly on" another element, there are no intervening elements present.

What is claimed is:

1. A protective cover for a portable communication device, the protective cover comprising:
    a battery cover; and
    a protective cover part coupled with the battery cover,
    the protective cover being detachably coupled with the portable communication device,
    the protective cover part being disposed at a front surface of a display unit part of the portable communication device when the protective cover is coupled with the portable communication device, and
    the portable communication device being turned off/on when the portable communication device is attached to/detached from the protective cover.

2. The protective cover of claim 1, wherein the protective cover part comprises:
    a display unit protecting cover disposed at a front surface of the display unit part when the protective cover is coupled with the portable communication device;
    a supporting member disposed at one end of the display unit protecting cover, the supporting member being coupled with the battery cover to support the battery cover; and
    a connecting member to connect the display unit protecting cover with the supporting member.

3. The protective cover of claim 2, wherein the supporting member comprises a first fixing member to couple with and fix the battery cover, and the connecting member comprises a second fixing member to couple with and fix the battery cover.

4. The protective cover of claim 3, wherein the first fixing member and the second fixing member have a decorated appearance and have at least one screw assembling part to allow a screw to extend through the protective cover part to be coupled with the battery cover.

5. The protective cover of claim 3, wherein the fixing members comprise metal.

6. The protective cover of claim 1, wherein the protective cover part comprises a magnetic force applying part to allow a magnetic force sensor included in the portable communication device to sense a change in magnetic force when the portable communication device is removed from the protective cover part to turn the portable communication device on, and to allow the magnetic force sensor to sense a change in magnetic force when the portable communication device is placed in the protective cover to turn the portable communication device off.

7. The protective cover of claim 1, wherein the protective cover is U-shaped.

8. The protective cover of claim 1, wherein the display unit part comprises a touch screen.

9. A protective cover for a portable communication device, comprising:
    a protective cover part comprising:
        a display unit protecting cover comprising a magnetic force applying part,
        a supporting member, and
        a connecting member connecting the display unit protecting cover and the supporting member; and
    a battery cover arranged between the display unit protecting cover and the supporting member, the battery cover being fixed to the protective cover part,
    wherein the protective cover is detachably coupled with the portable communication terminal, and
    wherein the magnetic force applying part allows a magnetic force sensor included in the portable communication device to sense a change in magnetic force when the portable communication device is attached to/detached from the protective cover to turn the portable communication device off/on.

10. The protective cover of claim 9, wherein the battery cover contacts the supporting member.

11. The protective cover of claim 9, wherein the battery cover is fixed to the protective cover part by a first fixing member and a second fixing member, each fixing member comprising a metal bar and two screws passing therethrough.

12. The protective cover of claim 11, wherein the first fixing member contacts a first surface of the supporting member and the battery cover contacts a second surface of the supporting member, the first surface of the supporting member being opposite the second surface of the supporting member, and
    wherein the second fixing member contacts a first surface of the connecting member and the battery cover contacts a second surface of the connecting member, the first surface of the connecting member being opposite the second surface of the connecting member.

13. The protective cover of claim 9, wherein the display unit protecting cover extends further from the connecting member than the supporting member does.

* * * * *